United States Patent [19]
Hirata

[11] Patent Number: 5,606,467
[45] Date of Patent: Feb. 25, 1997

[54] APPARATUS FOR CONTINUOUS RECORDING AND REPRODUCING OF DATA FROM A MAGNETIC TAPE CASSETTE COMPRISING A SEMICONDUCTOR MEMORY

[75] Inventor: Hidetoshi Hirata, Kanagawa, Japan

[73] Assignee: Fuji Photo Film Co., Ltd., Kanagawa, Japan

[21] Appl. No.: 755,374

[22] Filed: Sep. 5, 1991

[30] Foreign Application Priority Data

Sep. 17, 1990 [JP] Japan .................. 2-96463 U

[51] Int. Cl.$^6$ ...................................... G11B 27/24
[52] U.S. Cl. ...................... 360/69; 360/74.1; 360/74.4
[58] Field of Search ................. 360/69, 74.1, 74.4, 360/132

[56] References Cited

U.S. PATENT DOCUMENTS

| | | | |
|---|---|---|---|
| 4,338,644 | 7/1982 | Staar | 360/69 X |
| 4,396,958 | 8/1983 | Himeno et al. | 360/74.1 |
| 4,426,684 | 1/1984 | Sechet et al. | 360/13 X |
| 4,796,247 | 1/1989 | Vogelsang | 360/78.11 |
| 4,839,875 | 6/1989 | Kuriyama et al. | 360/132 X |

FOREIGN PATENT DOCUMENTS

| | | |
|---|---|---|
| 0373718 | 6/1990 | European Pat. Off. . |
| 63-168889 | 7/1988 | Japan . |
| 212775 | 1/1990 | Japan . |
| WO9102355 | 2/1991 | WIPO . |

*Primary Examiner*—Aristotelis Psitos
*Assistant Examiner*—Duncan Wilkinson
*Attorney, Agent, or Firm*—Sughrue, Mion, Zinn, Macpeak & Seas

[57] ABSTRACT

A semiconductor memory is installed in a magnetic tape cassette so as to enable electric signals transmitted from the outside of the magnetic tape cassette to be recorded therein or reproduced therefrom. In addition, the magnetic tape cassette includes an output/input terminal by way of which the semiconductor memory is electrically connected to a recording/reproducing unit. With this construction, when the direction of running of a magnetic tape is reversed during a recording or reproducing operation, the recording/reproducing function of the semiconductor memory can be utilized in place of the recording/reproducing function of the magnetic tape with the aid of a changeover signal previously inputted into the magnetic tape at a position, e.g., in the proximity of the end of the magnetic tape. Thus, the occurrence of interruption the recorded/reproduced signals can be prevented by virtue of the substitutive recording/reproducing function of the semiconductor memory.

16 Claims, 3 Drawing Sheets

APPARATUS FOR CONTINUOUS RECORDING AND REPRODUCING OF DATA FROM A MAGNETIC TAPE CASSETTE COMPRISING A SEMICONDUCTOR MEMORY

BACKGROUND OF THE INVENTION

The present invention relates generally to a cassette for containing a magnetic tape. More particularly, the present invention relates to a cassette for containing a magnetic tape, such as a magnetic tape intended for audio use or the like, wherein the magnetic tape is received in a winding state in a hollow space defined between a pair of upper and lower case halves, and a pair of hubs are rotatably supported in the hollow space so that the magnetic tape can practically be used upside down.

As is well known, magnetic tape cassettes have been extensively used for storing magnetic recording media used for recording/reproducing operations with an audio unit such as a magnetic tape recorder as well as a video unit such as a video tape recorder. The magnetic tape cassettes for audio use are generally constructed such that a magnetic tape is received in a wound state in the interior of a case body defined by a pair of upper and lower case halves, and a pair of flangeless hubs are rotatably supported in the case body.

With respect to the magnetic tape cassette which has been hitherto used for an audio unit, the hollow space defined by the pair of upper and lower case halves is divided into a recording/reproducing region and a tape receiving region with a partition interposed between the two regions. When the magnetic tape cassette is inserted into a recording/reproducing apparatus for performing a recording/reproducing operation, a magnetic head comes into contact with the magnetic tape received in the magnetic tape cassette.

As is well known, the magnetic tape cassette is constructed such that both an A-side and a B-side of the magnetic tape cassette can be selectively used for recording and reproduction by inserting the magnetic tape cassette into the audio unit either right-side-up or upside-down. In other words, the magnetic tape received in the magnetic tape cassette can be separately used with respect to each of upper and lower half regions of the tape in the direction of width of the tape. Thus, the full width of the magnetic tape can be used for recording and reproduction by reciprocally displacing the magnetic tape in the direction of width of the tape.

Automatic reversing tape units are available for performing continuous recording/reproducing with respect to both the A- and B-sides of the magnetic tape. In such units, the direction of running of the magnetic tape is reversed immediately after the end of the tape in each direction is detected. However, the recording or reproduction of the magnetic tape must once be interrupted, no matter how the recording/reproduction apparatus is constructed, when the direction of running of the magnetic tape is reversed. For this reason, it has been considered that it is unavoidable that a gap in the reproduced signals occurs when the direction of running of the magnetic tape is reversed. Therefore, for example, when a recording operation is performed with the conventional magnetic tape cassette, it is necessary to pay careful attention to a time required for performing a recording operation with one of the two sides of the magnetic tape cassette in order to prevent the occurrence of undesirable sound interruption.

SUMMARY OF THE INVENTION

The present invention has been made in consideration of the foregoing background, and an object thereof resides in providing a cassette for receiving a magnetic tape wherein the occurrence of undesirable sound interruption can reliably be prevented when the direction of running of the magnetic tape is reversed.

To accomplish the above object, there is provided, according to one aspect of the present invention, a cassette for containing a magnetic tape wherein the magnetic tape is received in a wound state in the hollow space defined between a pair of upper and lower case halves, and a pair of hubs are rotatably supported in the hollow space so that the magnetic tape can used in either orientation, wherein the cassette is characterized in that a semiconductor memory is installed in the hollow space so as to enable electric signals transmitted from the outside of the cassette to be recorded in the semiconductor memory or reproduced from the same, and the cassette includes an output terminal through which signals recorded in the semiconductor memory are inputted to a reproducing unit as well as an input terminal by way of which signals transmitted from a recording unit are inputted to the semiconductor memory.

Further, according to other aspects of the present invention, there is provided a cassette of the foregoing type for containing a magnetic tape, wherein the tape cassette is characterized in that a changeover signal is previously recorded on the magnetic tape at a position in the proximity of the end of a recording region of the magnetic tape in such a manner that the changeover signal can be detected by a sensor on the recording or reproducing unit so as to assure that a recording operation to be performed by the semiconductor memory is precisely started or stopped and an operation for outputting signals reproduced from the semiconductor memory is precisely started or stopped.

DESCRIPTION OF THE PREFERRED EMBODIMENTS

Figure 1:
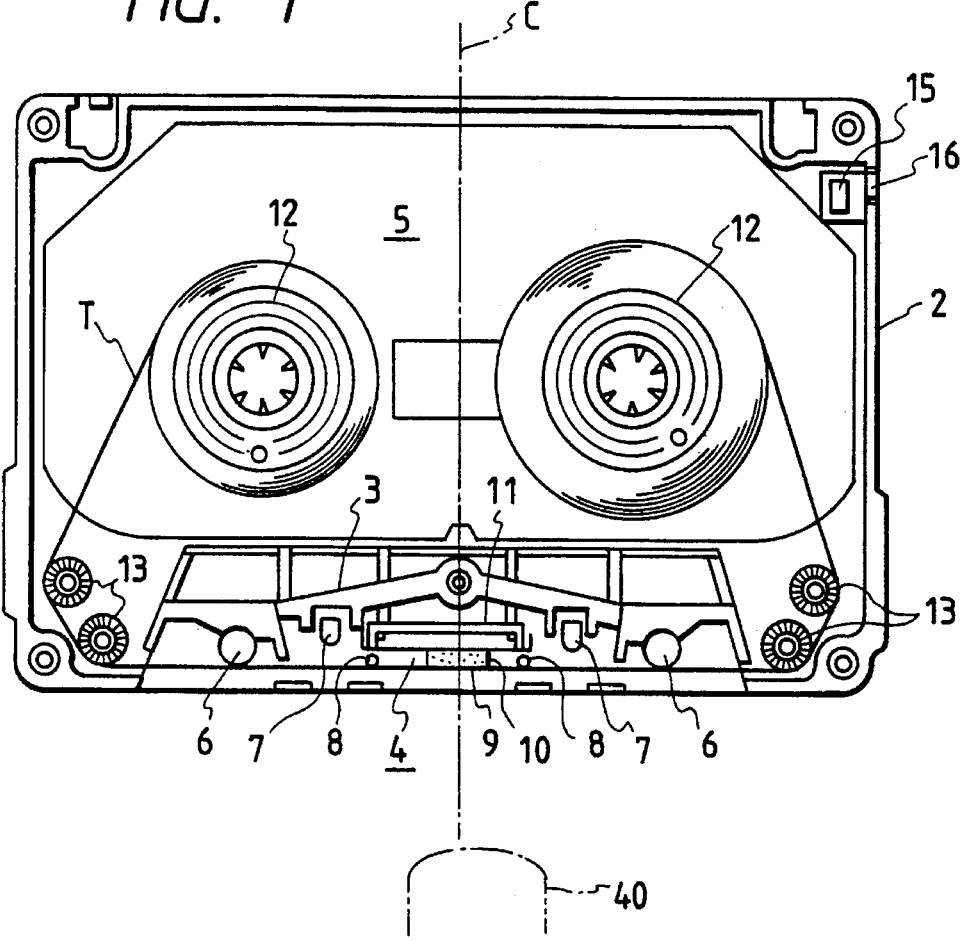
FIG. 1 is a plan view of a magnetic tape cassette constructed in accordance with a preferred embodiment of the present invention, particularly illustrating the arrangement of respective components in the magnetic tape cassette.
Figure 2:
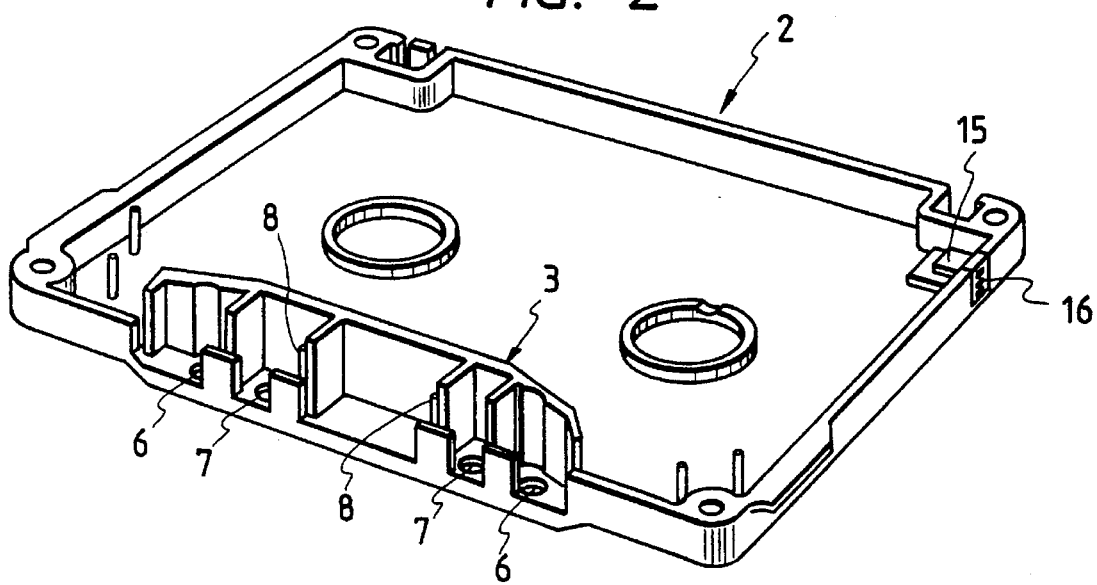
FIG. 2 is a perspective view of a lower case half.

The present invention will be described in detail hereinafter with reference to the accompanying drawings, which illustrate preferred embodiments of the present invention. In the drawings, FIG. 1 is a plan view which illustrates components installed in a lower case half, and FIG. 2 is a perspective view of the lower case half of FIG. 1 illustrating the state where various components have been removed therefrom for the purpose of simplification of illustration.

First, the overall structure of a cassette for containing a magnetic tape (hereinafter referred to simply as a "magnetic tape cassette") in accordance with a preferred embodiment of the present invention will be described below with reference to FIG. 1.

As is apparent from the structure shown in the drawings, the magnetic tape cassette of the present invention is constructed in substantially the same manner as a conventional audio-type magnetic tape cassette. Specifically, the magnetic tape cassette shown in FIG. 1 includes a pair of upper and lower case halves (only the lower case half 2 is shown in FIG. 1, the upper case half not being shown in the drawing for the purpose of simplification of illustration). The hollow space defined by the pair of upper and lower case halves is divided into a recording/reproducing region 4 and a tape receiving region 5 with a partition 3 interposed therebetween. A pair of hubs 12 arranged symmetrically relative to a center line C extends in the forward/rearward direction of the magnetic tape cassette as seen in the drawing, and a plurality of rotational guide rollers 12 and other components are arranged in the tape receiving region 5. On the other hand, a pair of capstan insertion holes 6, a pair of cassette position determining holes 7, and a pair of guide holes 8 are formed in the recording/reproducing region 4 in a symmetrical relationship relative to the center line C. In addition, a leaf spring 10 including a pressure pad 9 is installed at a position behind the guide poles 8, while a shield plate 11 is installed at a position behind the leaf spring 10.

The magnetic tape cassette of the present invention is entirely the same as a conventional cassette in structure with respect to the aforementioned elements. However, a characterizing feature of the magnetic tape cassette of the present invention resides in a semiconductor memory 15 which makes it possible to perform a recording/reproducing operation in response to an electric signal transmitted from the outside of the magnetic tape cassette. The semiconductor memory 15 is incorporated in the hollow space defined by the pair of upper and lower cassette halves.

The semiconductor memory 15 is located at a suitable position in the cassette case of the magnetic tape cassette. In the case shown in the drawings, the semiconductor memory 15 is located at a position adjacent to the right-hand side wall of the lower case half 2 at the rear end of the same as seen in the drawing. In addition, an output/input terminal 16 adapted to be electrically connected to terminals (not shown) of a recording/reproducing unit when the magnetic tape cassette is loaded in the recording/reproducing unit is disposed at a position in the proximity of the semiconductor memory 15 on the right-hand side wall of the lower case half 2. The output/input terminal 16 serves for outputting a signal recorded in the semiconductor memory 15 to a reproducing unit and inputting a signal from a recording unit into the semiconductor memory 15. To assure that the output/input terminal 16 is reliably connected to terminals of the recording/reproducing unit, even when the magnetic tape cassette is fitted into the recording/reproducing unit upside down, it is recommendable that, e.g., an opposing pair of terminals be disposed on the recording/reproducing unit.

It is desirable that the semiconductor memory 15 be, e.g., an electrically erasable and programmable ROM so called EEPROM, because no backup power supply source is required for such a memory device. Alternatively, the semiconductor memory 15 may be an electrically programmable ROM so-called as EP-ROM because such a device assures that a backup power supply source installed in the magnetic tape cassette can be used for a long period of time.

Figure 4:
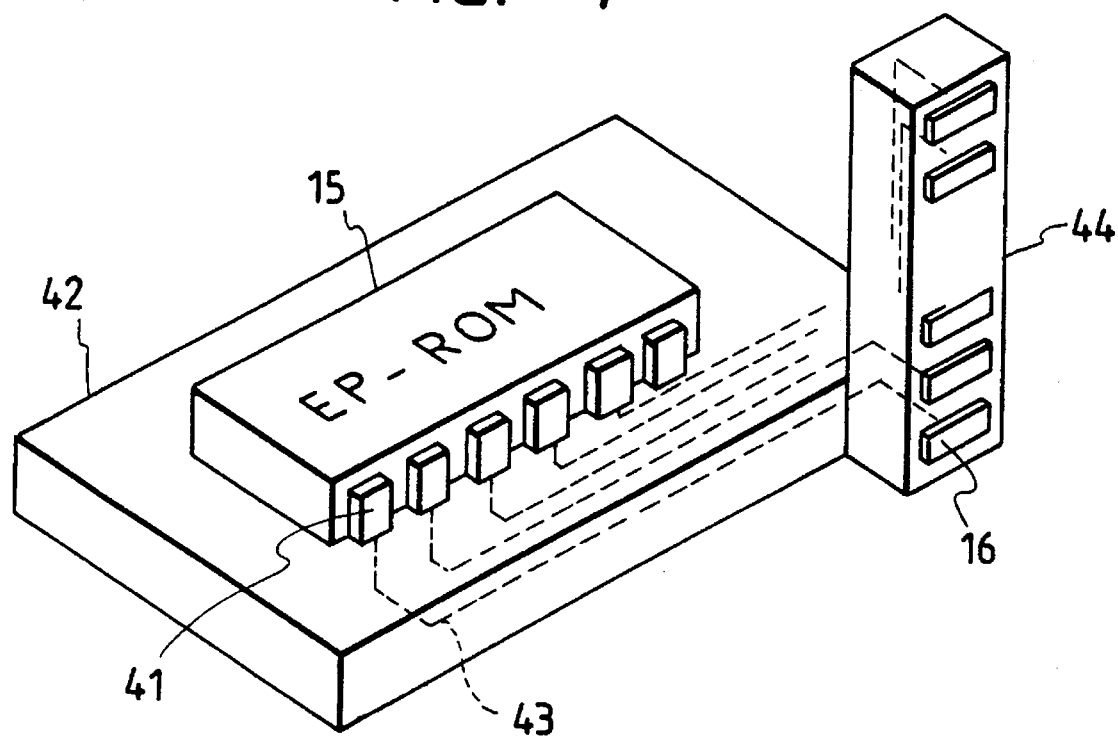
FIG. 4 is an enlarged perspective view showing the semiconductor memory 15 and output/input terminals 16.
Figure 5:
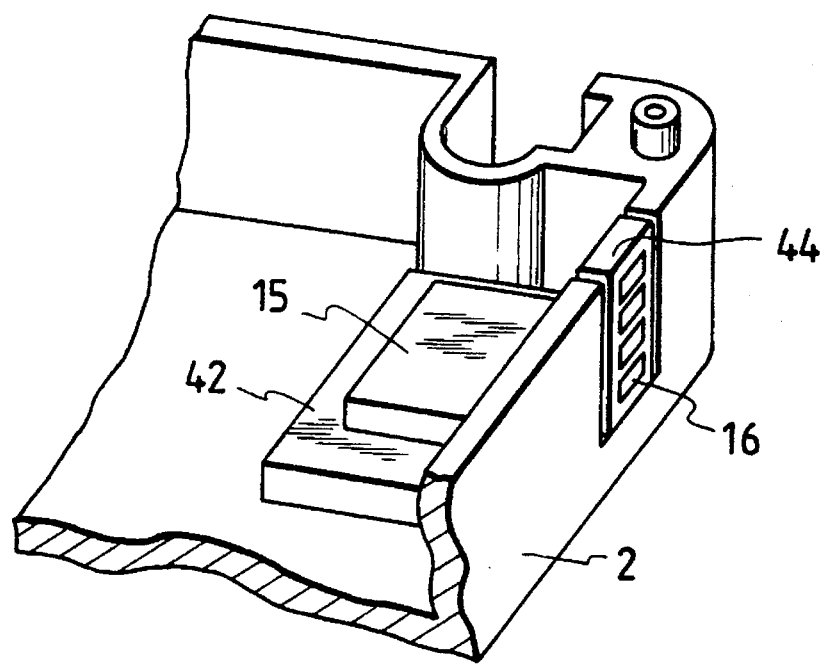
FIG. 5 is an enlarged. perspective view showing a unit of the semiconductor memory 15 and the output/input terminal 16 mounted on a cassette.

FIGS. 4 and 5 are enlarged perspective views showing the semiconductor memory 15 and output/input terminals 16.

The semiconductor memory 15 is mounted on the upper surface of a flexible substrate 42 through a plurality of lead terminals 41 projecting from the outer side surface of the memory 15. Each of the lead terminals 41 connects to one end of a connecting thin wire 43 which are previously arranged and enclosed within the substrate 42. The other end of the connecting wires 43 connects to each of the output/input terminals 16 through inside of a supporting member 44 which is unitary assembled with the substrate 42 for supporting the output/input terminals 16. The output/input terminals 16 extend toward a direction in which the magnetic tape cassette is inserted into and removed from the recording/reproducing apparatus. Each of the terminals 16 is spaced apart from each other along the vertical direction.

The recording/reproducing apparatus is provided therein with connecting terminals (not shown) which are electrically connectable to the output/input terminals 16.

The semiconductor memory 15 and the output/input terminals 16 thus constructed are previously assembled with each other as one unit through the substrate 42. The magnetic tape cassette is provided with a cut-off portion at a part of the side wall 2 thereof for receiving the supporting member 44 for the semiconductor memory 15.

Accordingly, during the assembly of the magnetic tape cassette, the unit consisting of the semiconductor memory 15, output/input terminals 16 and substrate 42 is mounted on the predetermined position by a fixing means such as an adhesive so that the assembly of the unit can be achieved much easily.

Figure 3:
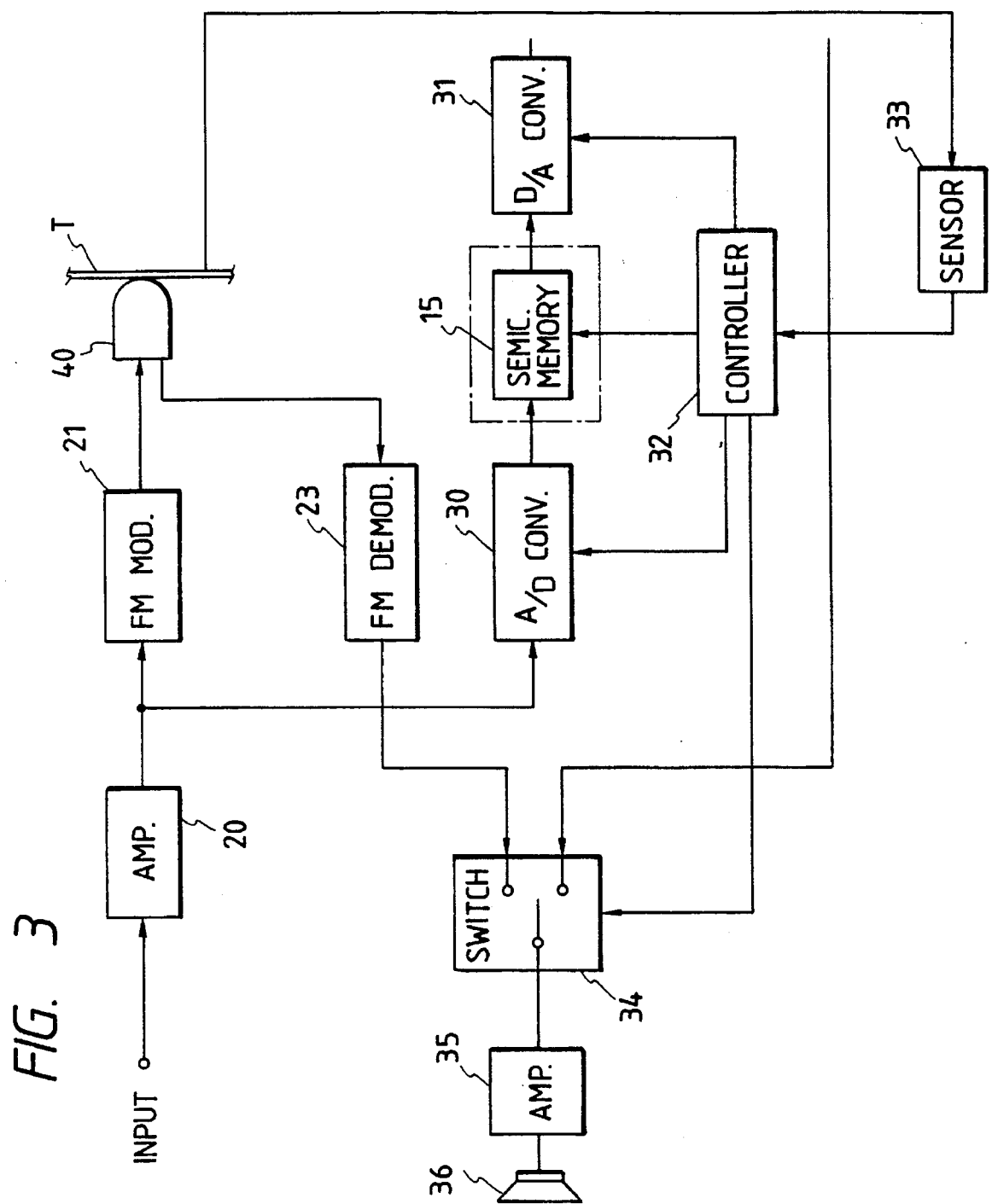
FIG. 3 is a block diagram schematically illustrating a method of performing a recording/reproducing operation using the magnetic tape cassette shown in FIG. 1.

Next, a description will be given below with reference to FIG. 3 as to a case where a recording/reproducing operation is performed using the magnetic tape cassette of the present invention constructed in the above-described manner.

As in the conventional case, after a series of input signals are amplified by an amplifier 20, a recording operation is performed on a magnetic tape T, with the amplified input signals being modulated in a FM modulator 21 and the modulated input signals transmitted to a magnetic head 40 for recording on the magnetic tape T. Also as in the conventional case, when a reproducing operation is performed with the magnetic tape T, signals picked up by the magnetic head 40 are demodulated in a FM demodulator 23, and the demodulated signals are then amplified by an amplifier 35 after they are transmitted to the amplifier via a switch 34. The amplified signals are applied to a speaker 36.

A changeover signal in the form of a magnetic signal, which is adapted to produce on reproduction an electric signal having a specific wavelength, is previously recorded on the magnetic tape T at a position near one end of the magnetic tape T (in the proximity of the junction to a leader tape). The foregoing changeover signal can be detected by a sensor 33 in the recording/reproducing unit. Thus, in the case where the direction of running of the magnetic tape T is automatically reversed by an automatic reversing mechanism, a controller 32 is activated when the changeover signal is detected by the sensor 33.

When the changeover signal is picked up by the sensor 33 during a recording operation, an A/D (analog/digital) converter 30 is activated by the controller 32 so as to allow an analog signal to be converted into a digital signal. The resultant digital signal is inputted into the semiconductor memory 15 via the output/input terminal 16, whereby a recording operation is started for allowing the digital signal to be stored in the semiconductor memory 15. It should be noted that the controller 32 may be constructed such that an operation for inputting a series of input signals to the magnetic head 40 is interrupted when the recording operation is started for the semiconductor memory 15o According to the present invention, however, since a switching operation is performed with the aid of the switch 34 (as described in more detail below), a recording operation is continuously performed for the magnetic tape T. Thereafter, when the direction of running of the magnetic tape T is reversed and a changeover signal effective in the opposite direction is picked up by the sensor 33, the operation of the A/D converter 30 and recording of signals in the semiconductor memory 15 are interrupted by the controller 32. An operation for reversing the direction of running of the magnetic tape T is accomplished as the recording operation is performed for the semiconductor memory 15 in the above-described manner.

Reproduction of the signals recorded in the above-described manner is carried out by way of the following steps. Specifically, when a changeover signal is picked up by the sensor 33, a D/A (digital/analog) converter 31 is activated by the controller 32, and, at the same time, the switch 34 is shifted to the D/A converter 31 side. This causes signals outputted from the semiconductor memory 15 to be converted to analog form. The analog signals are amplified by the amplifier 35, and then applied to the speaker 36 via the switch 34.

Thereafter, when the direction of running of the magnetic tape T is reversed and a changeover signal effective in the opposite direction is picked up the sensor 33, the switch 34 is shifted to the magnetic head 40 side from the D/A converter 31 side. In a case where a certain short period of time is required for activating circuits during a reproducing operation, it is recommendable to permit some delay to allow for such activation. To assure that such delay causes no problem, continuous sound reproduction can smoothly be achieved by properly controlling running of the magnetic tape T not only during a recording operation but also during a reproducing operation.

With the magnetic tape cassette constructed as described above, a recording operation is performed for the semiconductor memory 15 within a period from a time just before the direction of running of the magnetic tape T is reversed until a time immediately after the direction of running of the magnetic tape T is reversed, e.g., in parallel with a magnetic recording operation for the magnetic tape T or in place of the magnetic recording operation for the magnetic tape T. On the contrary, when a reproducing operation is performed, signals recorded in the semiconductor memory 15 are outputted therefrom in place of output signals from the magnetic tape T. Thus, undesirable sound interruption can reliably be prevented when the direction of running of the magnetic tape T is reversed.

While the present invention has been described above with respect to a preferred embodiment thereof, it should of course be understood that the present invention is not limited to this embodiment and that various changes or modifications may be made without departing from the scope of the invention.

According to the aforementioned embodiment of the present invention, the semiconductor memory is located on the rear side of the cassette, but other positions can be chosen as well, provided of course that no problem with the running of the magnetic tape is caused.

As is apparent from the above description, according to the present invention, a semiconductor memory is installed in the magnetic tape cassette so as to enable electric signals transmitted from the outside of the magnetic tape cassette to be recorded therein or reproduced therefrom. In addition, the magnetic tape cassette includes an output/input terminal by way of which the semiconductor memory is electrically connected to a recording/reproducing unit. With this construction, when the direction of running of a magnetic tape is reversed during a recording or reproducing operation, the recording/reproducing function of the semiconductor memory can be utilized in place of the recording/reproducing function of the magnetic tape with the aid of a changeover signal previously inputted into the magnetic tape at a position, e.g., in the proximity of the end of the magnetic tape. Thus, the occurrence of interruption of the recorded/reproduced signals can be prevented by virtue of the substitutive recording/reproducing function of the semiconductor memory. For example, as far as a music tape is concerned, the present invention can provide a magnetic tape cassette which assures that undesirable sound interruption does not arise at all.

What is claimed is:

1. A recording and reproducing apparatus with which at least one of a recording and reproducing operation can be continuously performed through a period before and after the direction of movement of a magnetic tape is reversed, comprising:

a magnetic tape cassette comprising:
a pair of upper and lower case halves defining a hollow space therebetween;
a pair of hubs rotatably supported in said hollow space;
a magnetic tape carried by said hubs;
semiconductor memory means installed in said hollow space to enable electric signals transmitted from outside said cassette to be recorded in said semiconductor memory means and reproduced from said semiconductor memory means, said electric
signals representing audio information;
an output terminal by way of which signals recorded in said semiconductor memory means are inputted to at least one of a recording and reproducing unit; and
an input terminal by way of which signals transmitted from said at least one of a recording and reproducing unit are inputted to said semiconductor memory means;
a sensor for detecting a changeover signal indicating a starting and a stopping point of a recording or reproducing operation by said semiconductor memory means, said changeover signal being recorded on said magnetic tape at a position near an end of a recording region of said magnetic tape; and
switch means operating in response to an output of said sensor for switching between reproduction from said magnetic tape and reproducing from said semiconductor memory means.

2. The cassette for containing a magnetic tape as claimed in claim 1, wherein said semiconductor memory means is disposed at a position adjacent a side wall of one of said case halves.

3. The cassette for containing a magnetic tape as claimed in claim 1, wherein said semiconductor memory means is disposed at a position adjacent a right-hand side wall of a lower case half at a rear end thereof.

4. The cassette for containing a magnetic tape as claimed in claim 1, wherein said semiconductor memory means is an Electrically Erasable and Programmable read-only memory.

5. The cassette for containing a magnetic tape as claimed in claim 1, wherein said semiconductor memory means is an Electrically-Programmable read-only memory.

6. The cassette for containing a magnetic tape as claimed in claim 1, wherein said semiconductor memory means comprises a substrate, a semiconductor memory device mounted on an upper surface of said substrate, a supporting member for supporting said substrate, and a plurality of output and input terminals mounted on said supporting member.

7. The cassette for containing a magnetic tape as claimed in claim 6, wherein said semiconductor memory device comprises a plurality of lead terminals projecting from an outer side surface of said memory device.

8. The cassette for containing a magnetic tape as claimed in claim 6, wherein said substrate is a flexible substrate.

9. The cassette for containing a magnetic tape as claimed in claim 7, wherein each of said lead terminals connects to a first end of a connecting thin wire previously arranged and enclosed within said substrate.

10. The cassette for containing a magnetic tape as claimed in claim 9, wherein a second end of said connecting wires connects to each of said output and input terminals through inside of said supporting member.

11. The cassette for containing a magnetic tape as claimed in claim 6, wherein said supporting member is unitarily assembled with said substrate.

12. The cassette for containing a magnetic tape as claimed in claim 6, wherein said output and input terminals extend toward a direction in which the magnetic tape cassette is inserted into and removed from the recording and reproducing apparatus.

13. The cassette for containing a magnetic tape as claimed in claim 6, wherein each of said terminals is spaced apart from each other along the vertical direction.

14. The cassette for containing a magnetic tape as claimed in claim 12, wherein said output and input terminals are electrically connectable to the recording and reproducing apparatus through connecting terminals.

15. A method of recording signals on a magnetic tape during a period just before and immediately after the direction of the magnetic tape is reversed, comprising the steps of:

driving a magnetic tape contained in a magnetic tape cassette in a first direction;

applying input signals to a magnetic head to record said input signals on said magnetic tape;

detecting the presence of a first changeover signal previously recorded on said magnetic tape at a position near an end of said magnetic tape;

interrupting recording of said input signals by said magnetic head and initiating recording of said input signals in a semiconductor memory contained in said magnetic tape cassette in response to detection of said first changeover signal, said input signals representing audio information;

reversing the direction of said magnetic tape;

detecting the presence of a second changeover signal previously recorded on said magnetic tape at a position near a start of said magnetic tape when said direction is reversed; and interrupting said recording operation of said semiconductor memory and resuming said recording by said magnetic head in response to detection of said second changeover signal.

16. A method of reproducing signals recorded on a magnetic tape during a period before and after the direction of the magnetic tape is reversed, comprising the steps of:

driving a magnetic tape contained in a magnetic tape cassette in a first direction;

detecting the presence of a first changeover signal recorded on said magnetic tape at a position near an end of said magnetic tape;

discontinuing reproduction of signals recorded on said magnetic tape and initiating reproducing of signals stored in said semiconductor memory, said signals representing audio information;

reversing the direction of said magnetic tape;

detecting a second changeover signal previously recorded on said magnetic tape at a position near a start of said magnetic tape when said direction is reversed; and discontinuing reproduction of said signals stored in said semiconductor memory and resuming reproducing of said signals recorded on said magnetic tape.

* * * * *